G. S. MacLEOD.
SAFETY CLIP FOR WHIFFLETREES AND NECK YOKES.
APPLICATION FILED MAR. 10, 1910.
997,457.
Patented July 11, 1911.
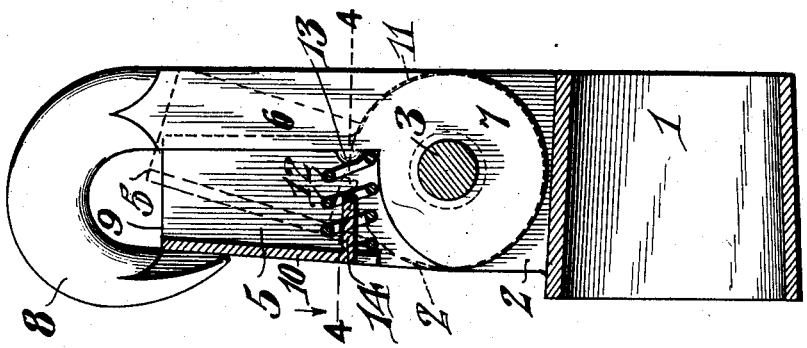
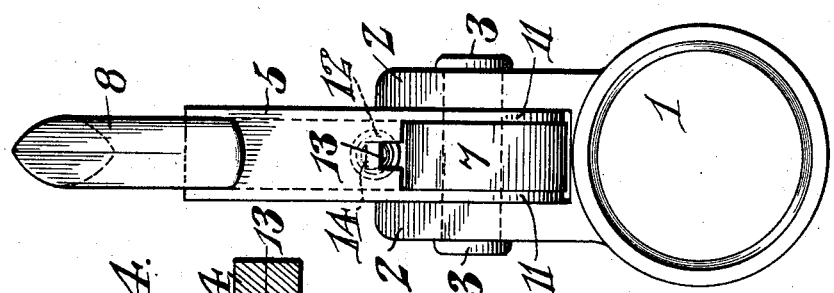
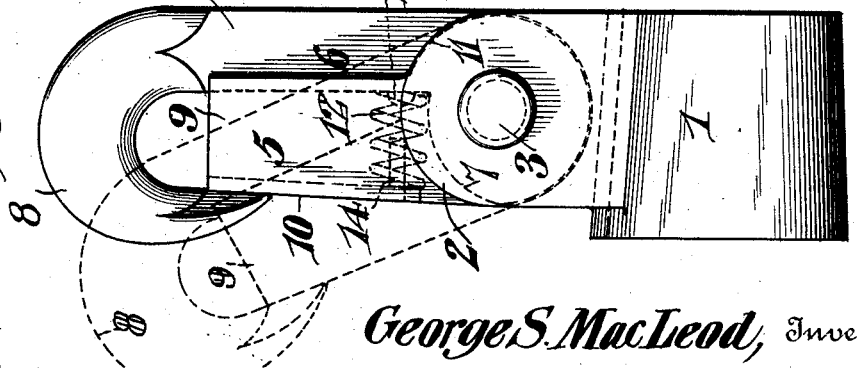
George S. MacLeod, Inventor

UNITED STATES PATENT OFFICE.

GEORGE STEWARD MacLEOD, OF SEATTLE, WASHINGTON.

SAFETY-CLIP FOR WHIFFLETREES AND NECK-YOKES.

997,457. Specification of Letters Patent. Patented July 11, 1911.

Application filed March 10, 1910. Serial No. 548,389.

*To all whom it may concern:*

Be it known that I, GEORGE S. MACLEOD, a citizen of the United States, residing at Seattle, in the county of King and State of Washington, have invented a new and useful Safety-Clip for Whiffletrees and Neck-Yokes, of which the following is a specification.

The invention relates to a safety clip for whiffletrees, neck yokes, etc.

The object of the present invention is to improve the construction of clips for whiffletrees, neck yokes, etc., and to provide a simple, inexpensive and efficient device of this character, designed particularly for use on heavy vehicles, and adapted also to be advantageously employed on light vehicles, and capable of securely retaining a trace in its attachment to a whiffletree, whereby accidents resulting from the traces becoming disconnected from the whiffletree will be effectually prevented.

With these and other objects in view, the invention consists in the construction and novel combination of parts hereinafter fully described, illustrated in the accompanying drawing, and pointed out in the claim hereto appended.

In the drawing:—Figure 1 is a plan view of a clip, constructed in accordance with this invention. Fig. 2 is a side elevation of the same. Fig. 3 is a horizontal sectional view. Fig. 4 is a transverse sectional view on the line 4—4 of Fig. 3.

Like numerals of reference designate corresponding parts in all the figures of the drawing.

In the embodiment of the invention illustrated in the accompanying drawing, the safety clip, which is designed for use on whiffletrees, neck yokes, etc., comprises in its construction a sleeve 1, provided with a pair of spaced forwardly extending ears 2, having alined perforations for the reception of a rivet 3, or other suitable fastening device, which constitutes a pivot for a hook 4 and a tongue 5. The sleeve, illustrated in the accompanying drawing, is tapered toward the outer end to fit the tapered end of a whiffletree (not shown), but it may be made cylindrical to correspond with the configuration of the central portion of the neck yoke (not shown). The hook 4 is provided at the inner end of its shank 6 with an approximately circular head or portion 7, which is provided with a central opening for the pivot or rivet 3. The shank 6 is rectangular in cross section, and the engaging portion or bill 8 is elliptical in cross section and tapers to a point, as shown. The outer side face of the shank 6 is arranged in the plane of the outer end of the sleeve 1, when the hook extends forwardly at right angles to the axis of the sleeve.

The tongue 5 is composed of spaced parallel sides 9 and a connecting outer portion 10, terminating short of the inner ends of the sides, which are enlarged to provide spaced approximately circular heads 11, located at opposite sides of the enlarged portion or head 7 of the hook and provided with registering openings for the pivot or rivet 3. The connecting web or portion 10 of the tongue extends along the inner side of the device, and it fits against the inner side of the bill of the hook, as clearly shown in Figs. 1 and 3 of the drawing. The spaced sides of the tongue extend across the space between the bill and the shank of the hook, and project slightly over the shank and fit against and slide on the flat upper and lower faces of the shank 6 in the opening and closing movements of the tongue. The front or outer end edges of the sides of the tongue are adapted to confine a trace or other connection in the bill of the hook. The tongue is maintained normally in engagement with the inner side of the bill of the hook by a coiled spring 12, housed within the tongue and interposed between the connecting web or portion 10 and the shank of the hook. The shank of the hook is provided with a projection or protuberance 13 to fit in the adjacent end of the spring, and the tongue is equipped with an integral inwardly extending arm or portion 14, disposed transversely of the device and projecting into the spring and supporting the same in its position transversely of the clip. The coiled spring is securely housed within the tongue and is thereby protected from injury and is adapted to maintain the tongue securely in its closed position, whereby a trace or other connection is effectually prevented from becoming accidentally disconnected from the device. The tongue is adapted to be readily depressed to enable a trace, or other connection to be engaged with the hook or to be disengaged therefrom, and it facilitates rapid hitching and unhitching, and at the same time affords perfect safety.

The device while designed particularly for use on the heavier class of vehicles, may be advantageously used on light vehicles.

The pivot permits a free oscillatory movement of the hook, as illustrated in dotted lines in Fig. 1 of the drawing, and the spring maintains the tongue in proper relation with the hook during such oscillatory movement. The pivot of the hook also constitutes the pivot of the tongue, and a joint or connection of great strength is thereby secured.

When working in the woods with teams it is the general custom among teamsters while going to and from work to unhitch one of the traces from the whiffletree and allow the latter to drag by the other trace to prevent the whiffletree from hitting the horses' heels, and from catching onto small stumps, brush, and the like. The hook and the tongue are adapted to swing together on the pivot 3, and they may be arranged either at right angles to a whiffletree or longitudinally thereof, and the tongue performs its function and forms a safety device when the hook is in either position. This will enable a whiffletree to be dragged along the ground hanging to one of the traces of a horse without liability of becoming disconnected from the trace and lost.

I claim—

A safety clip including a sleeve adapted to be fitted on the end of a whiffletree and having a pair of spaced forwardly extending perforate ears projecting from one side, a hook provided at the inner end of its shank with an approximately circular head having a central opening and arranged between the ears, a tongue composed of spaced parallel sides and a connecting outer portion, said sides having at their inner ends spaced approximately circular heads embracing the opposite sides of the head of the hook and fitted between the same and the ears and provided with registering openings, a pivot passing through the perforations of the ears and the openings of the heads to pivot both the hook and the tongue to the ears, and a spring for holding the tongue in tight engagement with the inner side of the free end of the hook, said tongue and hook being adapted to swing freely on their pivot, whereby the hook may be arranged either at right angles to or longitudinally of the whiffletree with the tongue in its engaged position performing its function to form a safety device.

In testimony, that I claim the foregoing as my own, I have hereto affixed my signature in the presence of two witnesses.

GEORGE STEWARD MacLEOD.

Witnesses:
L. G. LINKLETTER,
WALTER SHAVE.

---

Copies of this patent may be obtained for five cents each, by addressing the "Commissioner of Patents, Washington, D. C."